United States Patent
Maeshima et al.

(10) Patent No.: US 7,414,826 B2
(45) Date of Patent: Aug. 19, 2008

(54) METHOD FOR SELECTING ELECTROLYTIC SOLUTION FOR ELECTRIC DOUBLE LAYER CAPACITOR

(75) Inventors: Hiroyuki Maeshima, Kobe (JP); Hiroki Moriwake, Sanda (JP); Yoshinori Takamuku, Kyoto (JP); Mamoru Ito, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1056 days.

(21) Appl. No.: 10/493,238

(22) PCT Filed: Aug. 5, 2003

(86) PCT No.: PCT/JP03/09911

§ 371 (c)(1),
(2), (4) Date: Apr. 21, 2004

(87) PCT Pub. No.: WO2004/013878

PCT Pub. Date: Feb. 12, 2004

(65) Prior Publication Data

US 2004/0245120 A1 Dec. 9, 2004

(30) Foreign Application Priority Data

Aug. 6, 2002 (JP) ............................... 2002-228869

(51) Int. Cl.
*H01G 9/00* (2006.01)

(52) U.S. Cl. ...................... 361/523; 361/516; 361/525; 361/528; 361/502; 361/512; 29/25.01; 29/25.03

(58) Field of Classification Search ................ 361/523, 361/525, 528–529, 516–519, 502–504, 508–512, 361/302–305; 29/25.01, 25.03
See application file for complete search history.

(56) References Cited

U.S. PATENT DOCUMENTS

| 5,381,303 | A | * | 1/1995 | Yoshida et al. | 361/502 |
| 5,682,288 | A | * | 10/1997 | Wani | 361/502 |
| 6,195,251 | B1 | * | 2/2001 | Suhara et al. | 361/502 |
| 6,236,560 | B1 | * | 5/2001 | Ikeda et al. | 361/502 |
| 6,424,517 | B1 | * | 7/2002 | Ikeda et al. | 361/502 |
| 6,671,165 | B1 | * | 12/2003 | Nakazawa et al. | 361/502 |
| 6,898,067 | B1 | * | 5/2005 | Hiratsuka et al. | 361/302 |

FOREIGN PATENT DOCUMENTS

| JP | 9-50944 | 2/1997 |
| JP | 11-340101 | 12/1999 |
| JP | 2000-150320 | 5/2000 |
| JP | 2001-15158 | 1/2001 |
| JP | 2001-517205 | 10/2001 |

* cited by examiner

*Primary Examiner*—Nguyen T Ha
(74) *Attorney, Agent, or Firm*—Steptoe & Johnson LLP

(57) ABSTRACT

When an electrolytic solution of an electric double layer capacitor is prepared, an association is assumed as a model of a solute dissolved in a solvent. The energy of the association and the energies of the reduced association and oxidized association are calculated and a withstand voltage is estimated based thereon. If the withstand voltage exceeds the target value, only the estimated electrolytic solution is actually prepared. As a result, the development time in the development of electrolytic solution is greatly shortened.

4 Claims, 8 Drawing Sheets

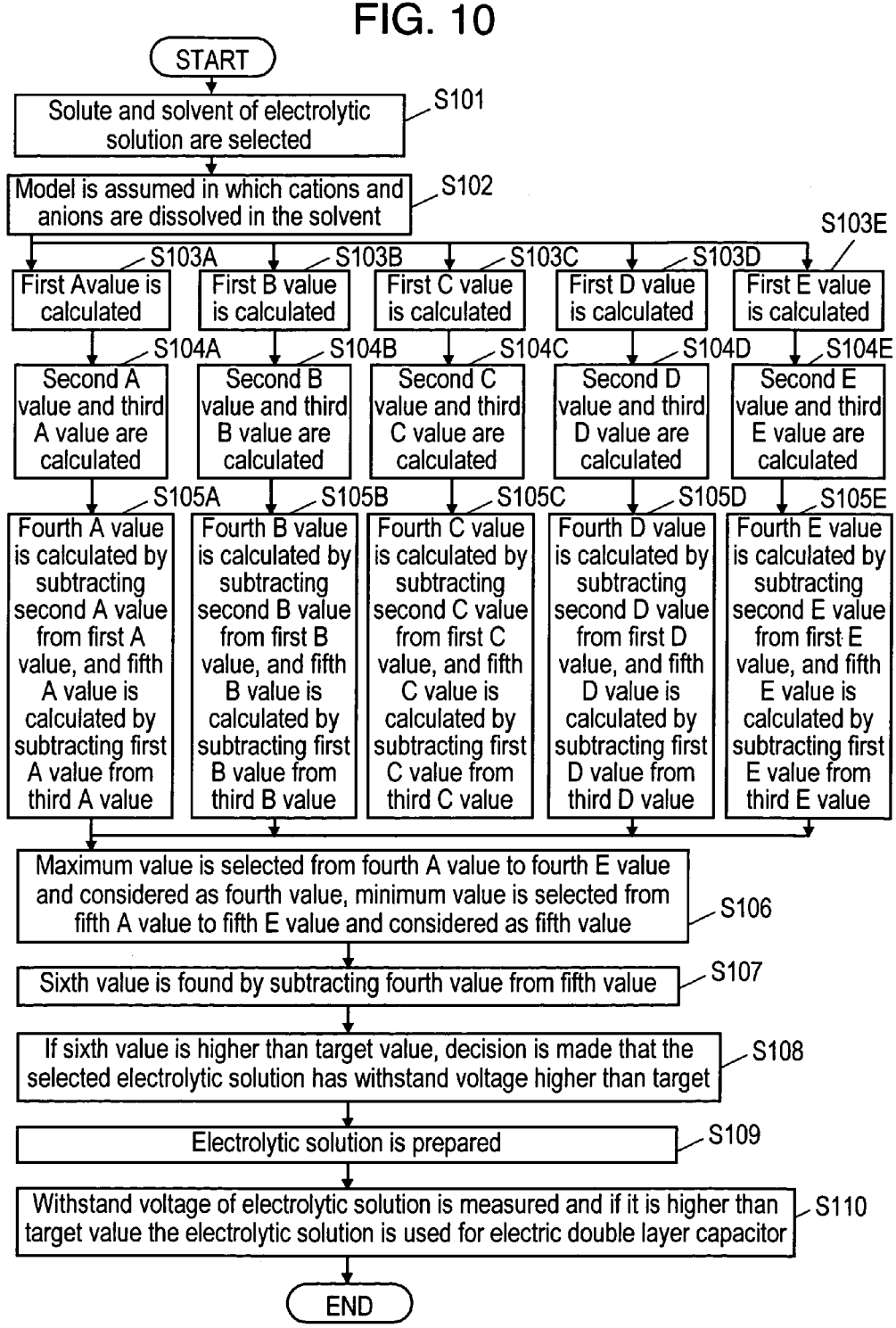

US 7,414,826 B2

METHOD FOR SELECTING ELECTROLYTIC SOLUTION FOR ELECTRIC DOUBLE LAYER CAPACITOR

TECHNICAL FIELD

The present invention relates to a method for selecting an electrolytic solution for an electric double layer capacitor.

BACKGROUND ART

Electric double layer capacitors are required to have a high withstand voltage. The withstand voltage of such capacitors depends on an electrolytic solution. Therefore, it is necessary to obtain an electrolytic solution having a high withstand voltage.

When an electrolytic solution is conventionally selected, electrolytic solutions are prepared by combining a large number of assumed solutes and solvents, and whether the electrolytic solutions have a target withstand voltage is determined by measuring the withstand voltage of the electrolytic solutions.

However, there are infinite numbers of solutes and solvents that can be actually assumed. Therefore, in order to extract the target electrolytic solution therefrom, it is necessary to prepare electrolytic solutions with appropriately selected combinations of solutes and solvents and to repeat again and again a trial and error procedure of measuring the withstand voltage of the electrolytic solutions. Thus, with the above-described procedure, a very long time is required to attain the target electrolytic solution and, therefore, a very long time is required to develop an electric double layer capacitor.

DISCLOSURE OF THE INVENTION

With the method for selecting an electrolytic solution in accordance with the present invention, a model is assumed in which the selected solute is dissolved in the selected solvent. Then, cations and anions constituting the solute form associations and the energy of the associations in a stable state thereof is calculated to obtain a first value. Then the energy of the association in a reduced state thereof is calculated to give a second value. On the other hand, the energy of the association in the oxidized state thereof is calculated to give a third value. Then, a fourth value is found by subtracting the second value from the first value, a fifth value is found by subtracting the first value from the third value, and a sixth value is then found by subtracting the fourth value from the fifth value. The sixth value is then compared with the target value and a combination of the solute and solvent for which the sixth value is higher than the target value is selected.

BRIEF DESCRIPTION OF THE DRAWINGS

FIG. 10 is a flow chart illustrating the method for selecting an electrolytic solution for the electric double layer capacitor of the second exemplary embodiment of the present invention.

DETAILED DESCRIPTION OF PREFERRED EMBODIMENTS

Exemplary Embodiment 1

Figure 1:
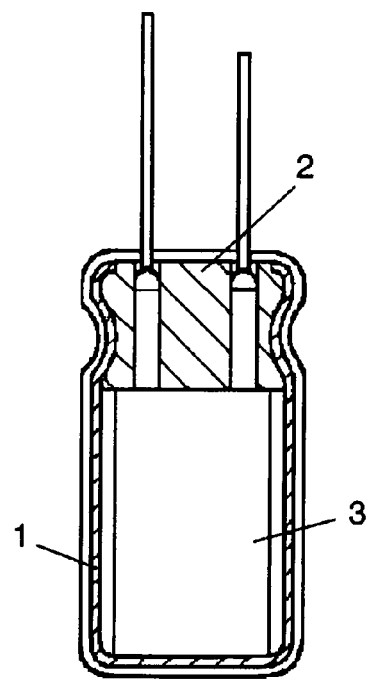
FIG. 1 is a cross-sectional view of the electric double layer capacitor of a first exemplary embodiment of the present invention.
Figure 2:
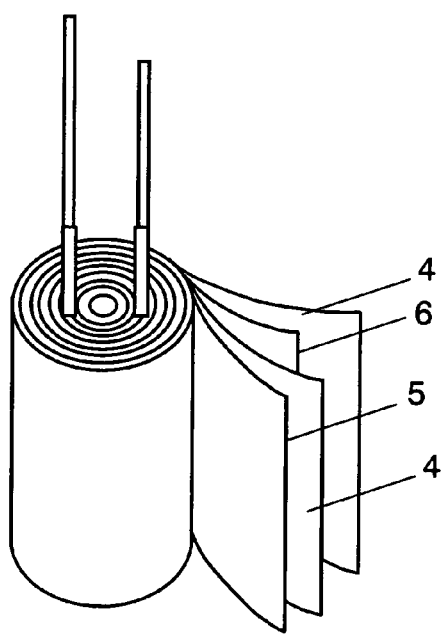
FIG. 2 is a perspective view of the main part of the electric double layer capacitor of the first exemplary embodiment of the present invention.
Figure 3:
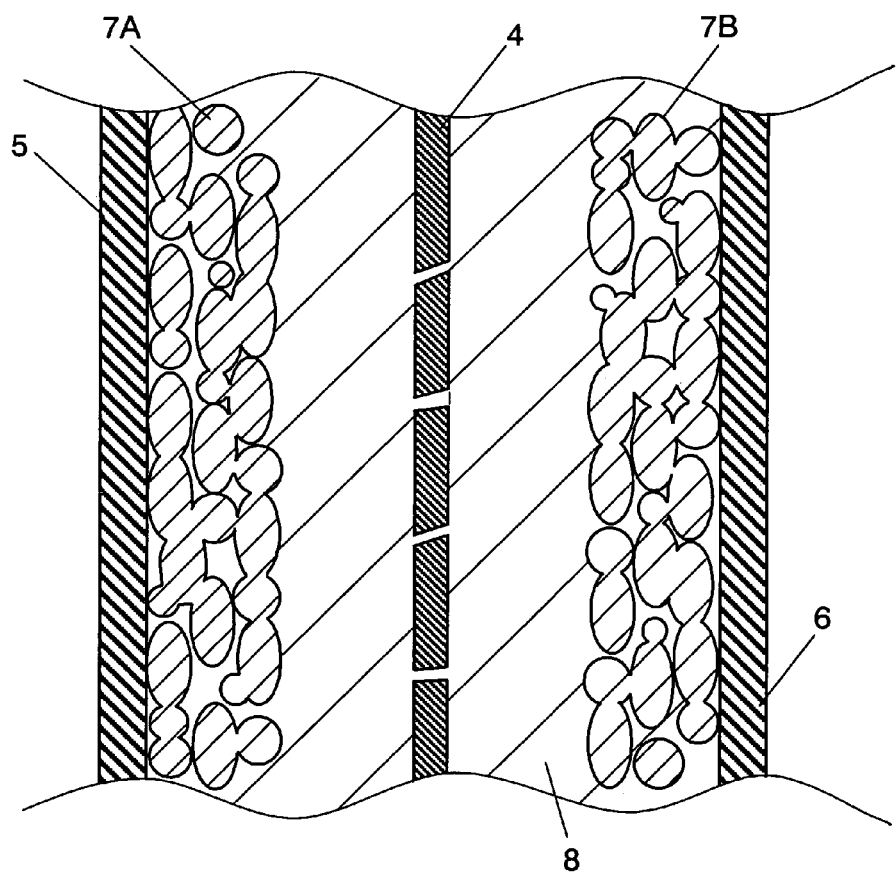
FIG. 3 is an enlarged cross-sectional view of the main part of the electric double layer capacitor of the first exemplary embodiment of the present invention.

FIGS. 1 to 3 show an electric double layer capacitor of the first exemplary embodiment. In the electric double layer capacitor, an element 2 is sealed inside an outer case 1 with a sealing rubber 3. The element 2, as shown in FIG. 2 and FIG. 3, is composed of a strip-like separator 4 and strip-like collectors 5, 6. The collectors 5, 6 are spirally wound on the front and rear surfaces of the separator 4. Active carbon 7A, 7B is provided on the surfaces of the collectors 5, 6 that face the separator 4. An electrolytic solution 8 placed into the outer case 1 is present between the collectors 5, 6. From the standpoint of weight and electric conductivity, aluminum is used for the outer case 1 and collectors 5, 6. When strength is important, stainless steel or nickel-plated iron may be used for the outer case 1. Nickel or the like may be used for the collectors 5, 6. The sealing rubber 3 is composed of a material such as ethylene-propylene rubber, which is not impregnated by electrolytic solutions. Furthermore, the separator 4 is composed of a microporous film or a nonwoven fabric of cellulose, polyethylene, or polypropylene.

In the present embodiment, the electrolytic solution 8 is selected by simulation and then this electrolytic solution is actually prepared. The procedure is explained with reference to FIGS. 4 to 7.

Figure 4:
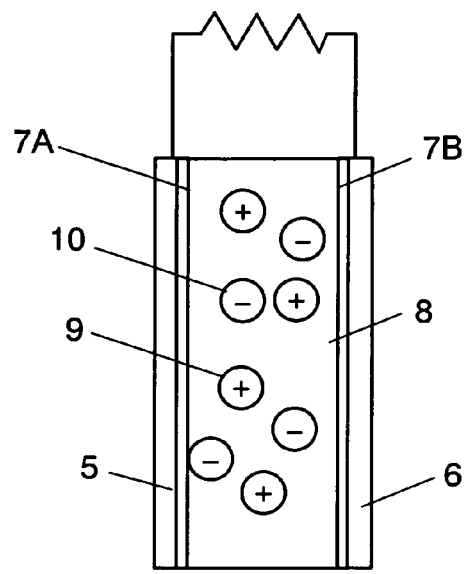
FIG. 4 and FIG. 5 are the drawings obtained by modeling the main part of the electric double layer capacitor of the first exemplary embodiment of the present invention.

FIG. 4 is a drawing modeling FIG. 3. The electrolytic solution 8 is present between the collectors 5, 6. In the state shown in FIG. 4, no voltage is applied between the collectors 5, 6. Therefore, cations 9 and anions 10 located inside the electrolytic solution 8 are present in a dispersed state.

Figure 5:
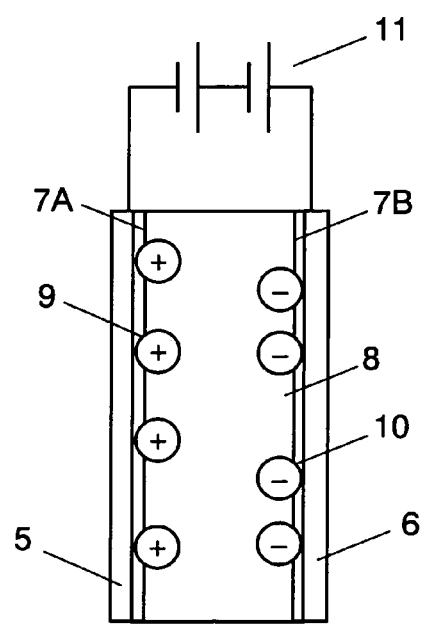
Figure 6:
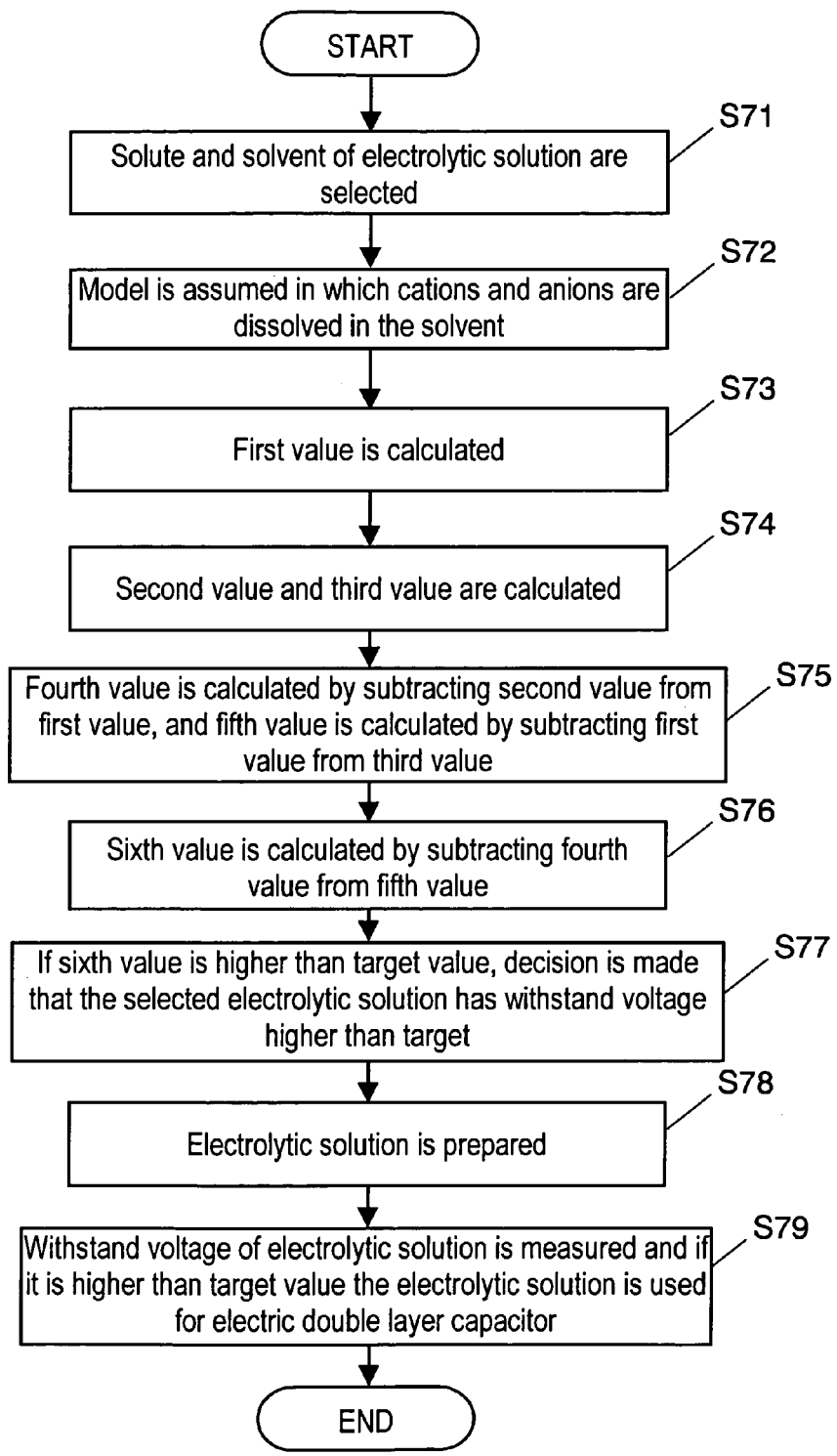
FIG. 6 is a flow chart illustrating the method for selecting an electrolytic solution for the electric double layer capacitor of the first exemplary embodiment of the present invention.

FIG. 5 shows a state in which a minus pole of a power source 11 is connected to the collector 5, and a plus pole of the power source 11 is connected to the collector 6. In this state, cations 9 are attracted to the surface of active carbon 7A provided on the inner side of the collector 5 by a negative electric charge of the surface of active carbon 7A. On the other hand, anions 10 are attracted to the surface of active carbon 7B provided on the inner side of the collector 6 by a positive electric charge of the surface of active carbon 7B.

Cations 9 and anions 10 are thus attracted by a negative electric charge and a positive electric charge, respectively, to the surface of active coal 7A, 7B provided on the inner sides of collectors 5, 6. As a result, the electric double layer capacitor accumulates energy. If a potential difference of at least a fixed value $V_R$ is applied between the cations 9 and the active carbon 7A, then electrons move from the surface of the active carbon 7A to the electrolytic solution 8. Further, if a potential difference of at least a fixed value $V_O$ is applied between the anions 10 and the active carbon 7B, then electrons move from the electrolytic solution 8 to the surface of the active carbon 7B. The withstand voltage in the electric double layer capacitor means the value of a potential window $V_W$ obtained by adding $V_R$ to $V_O$.

The electrolytic solution 8 greatly affects the withstand voltage of the electric double layer capacitor. Therefore, it is necessary to investigate which chemical species have to be selected for the electrolytic solution 8 in order to ensure a high withstand voltage. In the present embodiment, the electrolytic solution 8 is selected according to the procedure illustrated by FIG. 6. Each step shown in FIG. 6 will be explained hereinbelow.

Figure 7:
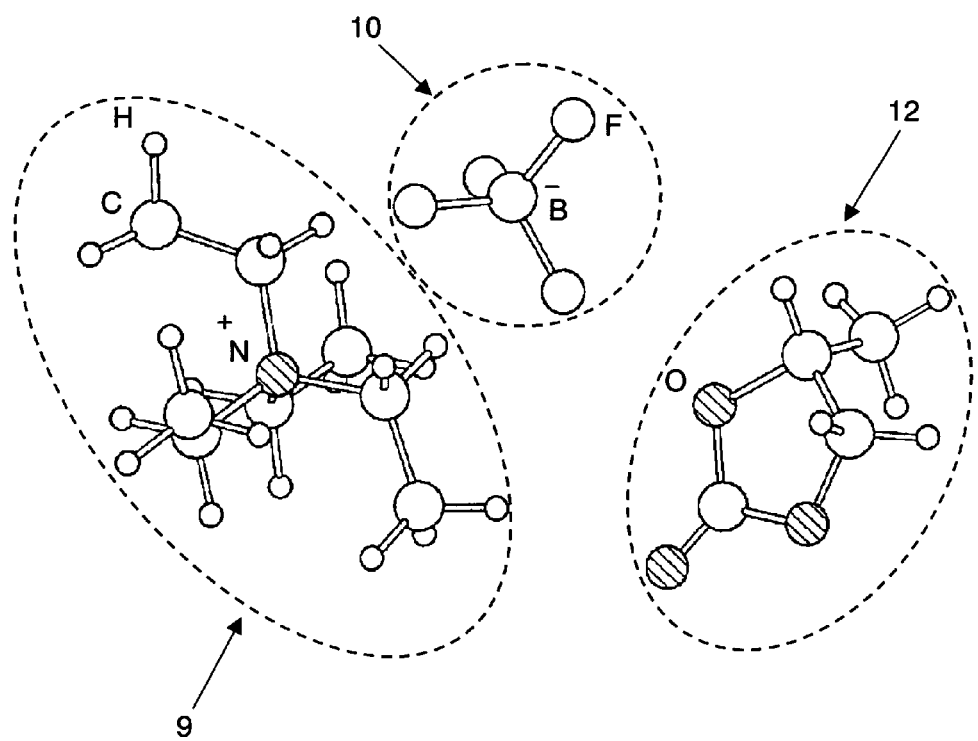
FIG. 7 is a schematic drawing of the electrolytic solution of the electric double layer capacitor of the first exemplary embodiment of the present invention.

First, in S71, an electrolytic solution is selected. This electrolytic solution is composed of cations 9, anions 10, and a solvent 12, as shown in FIG. 7. More specifically, FIG. 7 illustrates the case in which cations 9 are tetraethylammonium (TEA), anions 10 are tetrafluoroborate, and the solvent 12 is propylene carbonate. Those compounds represent an example, and the present selection method is not limited to this combination.

Then, in S72, a model is assumed in which the cations 9 and anions 10 are dissolved in the solvent 12. In the present embodiment, it is supposed that the cation 9 and anion 10 form an association and this association is a dimer composed of one cation 9 and one anion 10.

Then, in S73, the energy of the association that is formed by the cation 9 and anion 10 and assumes a stable state is calculated by simulation and taken as a first value. This simulation is conducted by using molecular orbital computation. More specifically, for example, a model is assumed in which a cavity is provided inside a continuous dielectric body having a dielectric constant of a solvent and an association is embedded in the cavity, and the energy of the association in this state is calculated by simulation using molecular orbital calculations. However, the model that can be assumed is not limited to the aforesaid model.

Then, in S74, the energies of the reduced and oxidized association are calculated similarly to the computation conducted in S73 and taken as a second value and a third value. When the associations are reduced, electrons move from the active carbon 7A to the associations located in the vicinity of the surface of the active carbon 7A provided on the inner side of the collector 5 shown in FIG. 5. On the other hand, when the associations are oxidized, the electrons move from the associations located in the vicinity of the surface of the active carbon 7B provided on the inner side of the collector 6 shown in FIG. 5 to the active carbon 7B. Thus, reduction and oxidation of the associations mean that negative or positive electric charges stored in the collectors 5, 6 move in the electrolytic solution 8. As a result, the energy stored in the electric double layer capacitor is released. Furthermore, at the same time, the cations 9 and anions 10 forming the associations assume a state close to that of radicals and easily induce a chemical reaction, and a state is assumed in which the electrolytic solution 8 can be easily decomposed.

Then, in S75, a fourth value is found by subtracting the second value from the first value, and a fifth value is found by subtracting the first value from the third value. The fourth value means the gain of energy during reduction of associations on the side of collector 5, and the fifth value means the loss of energy during oxidation of associations on the side of collector 6.

Then, in S76, a sixth value is found by subtracting the fourth value from the fifth value. The magnitude of this sixth value is the width of the potential window that is estimated by the simulation conducted in the present embodiment, that is, the withstand voltage of the electric double layer capacitor. More specifically, because the sixth value is energy and the width of the potential window is the difference in potential, unit is changed. Thus, the estimated value of the potential window is found by recalculating the sixth value into eV unit and reading the units of the numerical value after recalculation as V.

Then, in S77, the sixth value is compared with the target value of withstand voltage. When the sixth value is higher than the target value, the electrolytic solution composed of the selected cations 9, anions 10, and solvent 12 is considered to be suitable for the manufacture of an electric double layer capacitor with a high withstand voltage.

Then, in S78, the cations 9 and anions 10 are dissolved in the solvent 12 and an electrolytic solution is actually prepared by using the materials specified in S71 to S77.

Then, in S79, the withstand voltage of the prepared electrolytic solution is measured, and when the withstand voltage estimated by the simulation of S71 to S76 is confirmed to be within a margin range causing no problems in practical use, this electrolytic solution is used as the electrolytic solution for an electric double layer capacitor.

As described above, the most important specific feature of the present embodiment, is that when the electrolytic solution 8 is developed, the electrolytic solutions which are estimated in advance to have a high withstand voltage are preliminary selected by simulation, without repeating a countless number of trial and error cycles as in the conventional procedures. The small number of selected electrolytic solutions are then actually prepared and the withstand voltage thereof is measured. Employing such a procedure greatly shortens the development period of electrolytic solution 8. A method for estimating the withstand voltage of an electrolytic solution by picking up one solute ion (anion or cation), considering it as a single ion in vacuum, and conducting simulation of energy during oxidation and reduction of the ion has been also conventionally conducted. However, between the simulated value and the actual withstand voltage of electrolytic solutions obtained by dissolving a solute in a solvent, the spread of numerical values is large. On the other hand, as described above, the withstand voltage of an electrolytic solution can be accurately estimated by assuming a model in which associations are generated when cations 9 and anions 10 are dissolved in the solvent 12. The aforesaid steps make it possible to manufacture an electric double layer capacitor with a very high efficiency.

Figure 8:
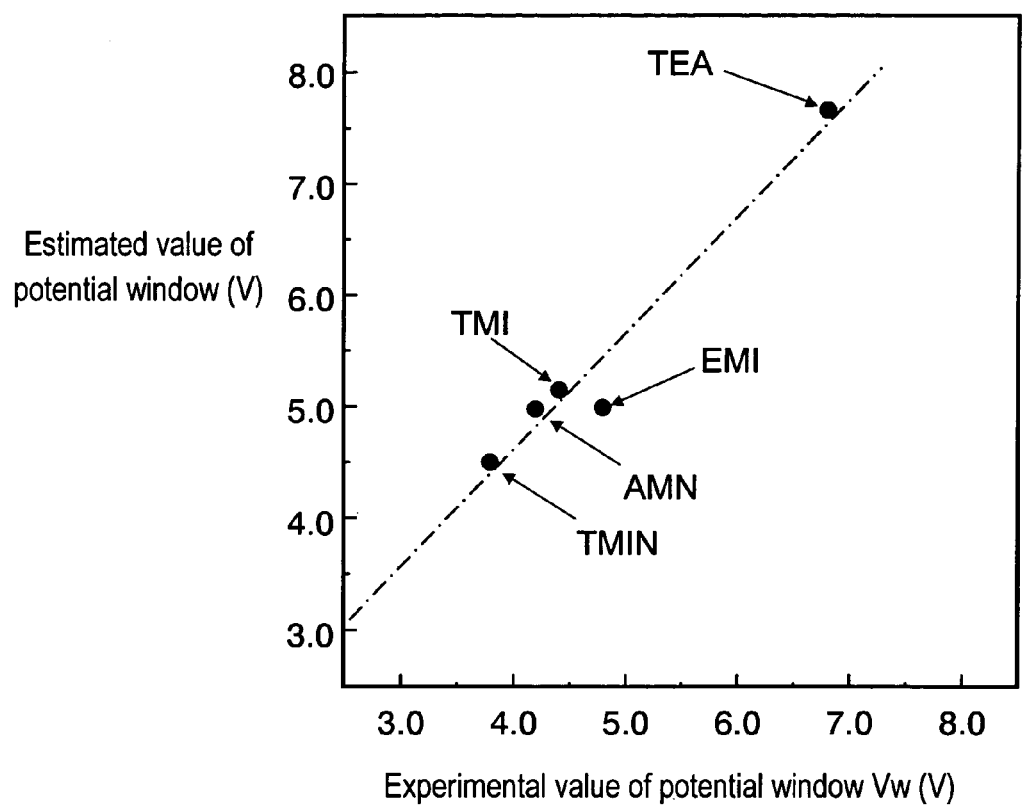
FIG. 8 illustrates the relationship between estimated values calculated by computation and experimental values of the potential window of various electrolytic solutions in the first exemplary embodiment of the present invention.

The present embodiment will be described hereinbelow with reference to an example in which various solutes were dissolved in propylene carbonate. FIG. 8 illustrates the relationship between the estimated value (sixth value) of the potential window found by the above-described simulation and the potential window $V_W$ found by an experiment; in case in which anion 10 is tetrafluoroborate as a solute. The study was conducted for five types of cations 9: tetraethylammonium, 1-ethyl-3-methyl imidazolium (EMI), 1,2,3-trimethyl imidazolium (TMI), 5-aza-1-azonia-5-methylbicyclo[4.3.0] nonane (AMN), and 1,2,3,4-tetramethyl imidazolium (TMIN).

A Hartree-Fock method and molecular orbital calculations based on 3-21+G basis sets are employed for computing the potential window. Furthermore, a cyclic voltammetry method is used for measuring the potential window. In the measurement, glassy carbon is used for a working electrode, platinum is used for a counter electrode, and an Ag/Ag$^+$ electrode is used for the reference electrode. Oxidation and reduction of electrolytic solution are estimated to occur when an electric current density of 1 mA/cm$^2$ is obtained at the working electrode at a potential scanning rate of 10 mV/sec, and the potential at this time is considered as a critical potential. The difference between the critical potentials at the oxidation side and reduction side is considered to be a potential window Vw.

As shown in FIG. 8, there is a linear relationship between the calculated and experimental values of the potential window. Thus, the simulation computation in the present embodiment makes it possible to estimate the width of the potential window for combinations of solvents and solutes.

In the present embodiment, a Hartree-Fock method and molecular orbital calculations based on 3-21+G basis sets are employed for computing the potential window, but the computation method is not limited thereto.

Exemplary Embodiment 2

Figure 9:
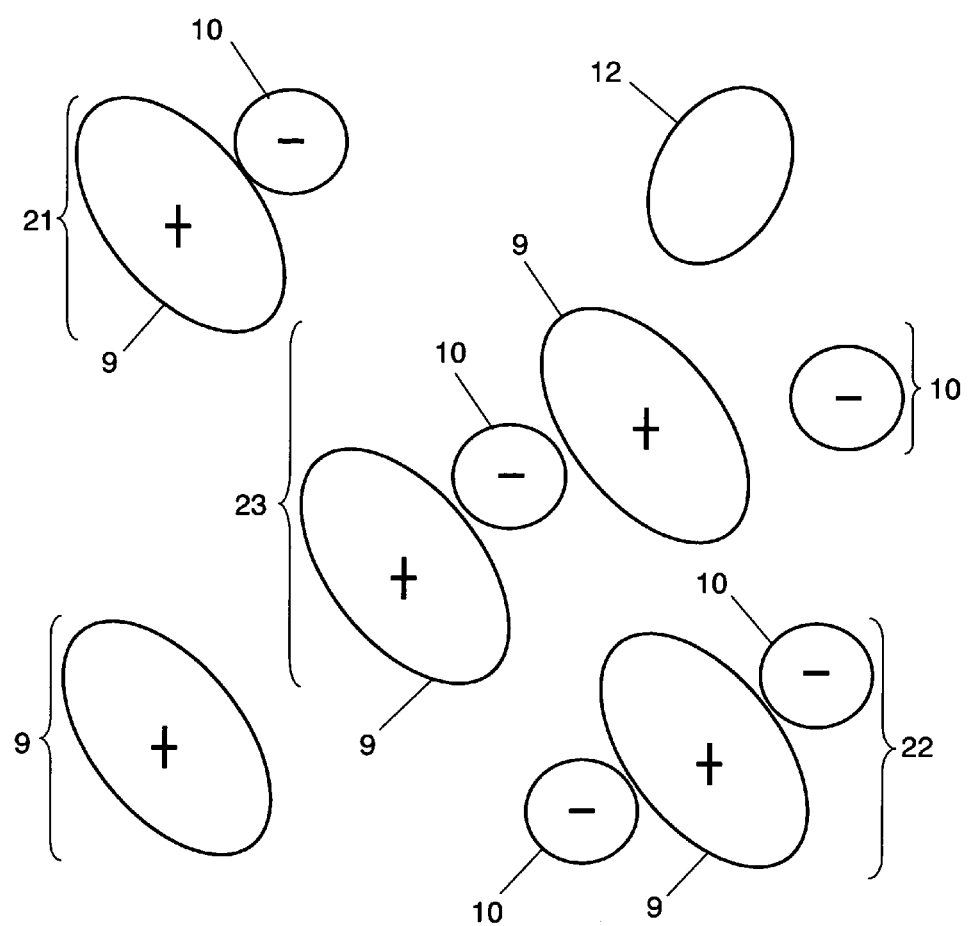
FIG. 9 is a schematic drawing of the electrolytic solution of the electric double layer capacitor of a second exemplary embodiment of the present invention.

The explanation relating to the configuration of the electric double layer capacitor and ion model in the electrolytic solution of the second exemplary embodiment is identical to that of the first embodiment and is therefore omitted. The difference between this embodiment and the first embodiment is in the assumptions relating to associations. Thus, in the present embodiment, a plurality of different associations formed by cations 9 and anions 10 are assumed. More specifically, as shown in FIG. 9, the following associations are assumed:

(1) a dimer 21 composed of one cation 9 and one anion 10;
(2) a trimer 22 composed of one cation 9 and two anions 10; and
(3) a trimer 23 composed of two cations 9 and one anion 10.

Furthermore, individual cations 9 that do not form associations and individual anions 10 that do not form associations are also assumed.

In the present embodiment, an electrolytic solution is selected according to the procedure shown in FIG. 10. Each of the steps in FIG. 10 will be described hereafter.

First, in S101, an electrolytic solution is selected. This electrolytic solution is composed of cations 9, anions 10, and solvent 12.

Then, in S102, a model is assumed in which the cations 9 and anions 10 are dissolved in the solvent 12. In the present embodiment, dimers 21, trimers 22, and trimers 23 are assumed as associations. Furthermore, individual cations 9 that do not form associations and individual anions 10 that do not form associations are also assumed. If there are models in which any of dimers 21, trimers 22, trimers 23, cations 9 and anions 10 cannot be present, the model thereof is excluded.

Then, in S103A, a first A value is found by calculating the energy of the dimer 21 in a stable state by simulation.

Then, in S104A, a second A value and a third A value are found by calculating the energies of the reduced dimer 21 and oxidized dimer 21.

Then, in S105A, a fourth A value is found by subtracting the second A value from the first A value, and a fifth A value is found by subtracting the first A value from the third A value. The fourth A value means the gain of energy during reduction of the dimer 21 on the side of collector 5, and the fifth A value means the loss of energy during oxidation of the dimer 21 on the side of collector 6.

Similarly, S103B-S105B are applied to the trimer 22 and S103C-S105C are applied to the trimer 23 to find the respective fourth B value, fifth B value, fourth C value, and fifth C value. Furthermore, S103D-S103D and S103E-S105E are applied to cation 9 and anion 10, respectively, to find the fourth D value, fifth D value, fourth E value, and fifth E value. The detailed explanation of those steps is omitted because they are identical to steps S103A-S105A relating to the dimer 21 and differ only in the target association and individual ion. Methods for computing each energy in S103A-S103E and S104A-S104E are identical to the method of the first embodiment.

Then, in S106, a fourth value is obtained by selecting a maximum value of the fourth A value, fourth B value, fourth C value, fourth D value, and fourth E value. Furthermore, a fifth value is obtained by selecting a minimum value of the fifth A value, fifth B, value, fifth C value, fifth D value, and fifth E value. Then, in S107, a sixth value is found by subtracting the fourth value from the fifth value. The magnitude of this sixth value is the width of the potential window that is estimated by the simulation conducted in the present embodiment, that is, the withstand voltage of the electric double layer capacitor. More specifically, because the sixth value is energy and the width of the potential window is the difference in potential, unit is changed, in the same manner as in the first embodiment. Thus, of the associations, individual cations and individual anions that are assumed to be present in the electrolytic solution, the withstand voltage of electrolytic solution is determined by the chemical species that are the easiest to be reduced and the chemical species that are the easiest to be oxidized.

In the above-described procedure, when the energy gain obtained during reduction of the trimer 23 or cation 9 having a positive electric charge is considered to be sufficiently large and the fourth C value or fourth D value are considered to be sufficiently small, it is not necessary to find those fourth C value or fourth D value. Thus, when the fourth value is determined in S106, they may be disregarded. Further, when the energy loss obtained during oxidation of the trimer 22 or anion 10 having a negative electric charge is considered to be sufficiently large and the fifth B value or fifth E value are considered to be sufficiently large, it is not necessary to find those fifth B value or fifth E value. Thus, when the fifth value is determined in S106, they may be disregarded. The model in which there is not any of the cation 9 and anion 10 may be considered.

Then, in S108, the sixth value is compared with the target value of withstand voltage. When the sixth value is higher than the target value, the electrolytic solution composed of the selected cations 9, anions 10, and solvent 12 is considered to be suitable for the manufacture of an electric double layer capacitor with a high withstand voltage.

Then, in S109, the cations 9 and anions 10 are dissolved in the solvent 12 and an electrolytic solution is actually prepared by using the materials specified in S101 to S108.

Then, in S1001, the withstand voltage of the prepared electrolytic solution is measured, and when the withstand voltage estimated by the simulation of S101 to S107 is confirmed to be within a margin range causing no problems in practical use, this electrolytic solution is used as the electrolytic solution for an electric double layer capacitor.

As described above, the most important specific feature of the present embodiment is that electrolytic solutions which are estimated in advance to have a high withstand voltage are preliminary selected by simulation and a small number of selected electrolytic solutions are then actually prepared, without repeating a countless number of trial and error operations, as in the conventional procedures, for the development of electrolytic solution 8. Employing such a procedure greatly shortens the development period of electrolytic solution 8. The withstand voltage of an electrolytic solution can be accurately estimated by assuming a model in which cations 9 and anions 10 are dissolved in the solvent 12, as described above.

The aforesaid steps make it possible to manufacture an electric double layer capacitor with a very high efficiency.

Further, whether to employ the model described in the first embodiment in which an association is considered to be a dimer or the model described in the second embodiment in which a variety of associations are assumed can be decided based on the combination of solvents and solutes. Thus, for the combinations of solvents and solutes in which associations of a plurality of different types are apparently present, the computations are preferably conducted by assuming a model as in the second embodiment. It is effective to arrange the models based on the physical properties of those materials. Furthermore, for certain combinations of solvents and solutes, a model may be assumed which includes any associations that can be present, for example tetramers, in addition to the dimers 21, trimers 22, and trimers 23, as the associations of cations 9 and anions 10.

INDUSTRIAL APPLICABILITY

With the method for selecting an electrolytic solution in accordance with the present invention, when an electrolytic solution for an electric double layer capacitor is prepared, the withstand voltage is estimated by simulation assuming the presence of associations. Then, only the electrolytic solutions with the estimated value exceeding the target value are actually prepared. As a result, the trial and error stage in the development of electrolytic solution is eliminated and the development time is significantly shortened. Furthermore, as a result, the electric double layer capacitors can be manufactured with a very high efficiency.

The invention claimed is:

1. A method for selecting an electrolytic solution for an electric double layer capacitor, comprising:
    A) a step of selecting a solute and a solvent;
    B) a step of assuming a model in which a cation and an anion constituting the solute form an association when the solute is dissolved in the solvent;
    C) a step of calculating the energy of the association when the association is in a stable state, to be considered a first value;
    D) a step of calculating the energy of the association when the association is reduced, to be considered a second value;
    E) a step of calculating the energy of the association when the association is oxidized, to be considered a third value;
    F) a step of finding a fourth value by subtracting the second value from the first value, and finding a fifth value by subtracting the first value from the third value;
    G) a step of finding a sixth value by subtracting the fourth value from the fifth value; and
    H) a step of comparing the sixth value with a target value of a potential window.

2. The method for selecting an electrolytic solution for an electric double layer capacitor, according to claim 1, further comprising:
    I) a step of preparing an electrolytic solution in which the solute is dissolved in the solvent, when the sixth value is greater than the target value; and
    J) a step of measuring the withstand voltage of the electrolytic solution prepared in the step I and comparing the measured value with the target value of the potential window.

3. The method for selecting an electrolytic solution for an electric double layer capacitor, according to claim 1, wherein
    in the step B, chemical species composed of at least some of a plurality of different associations, individual cations constituting the solute, and individual anions constituting the solute are assumed and the steps C-F are executed with respect to all the chemical species; and
    in the step G, the maximum fourth value is selected from a plurality of the fourth values, the minimum fifth value is selected from a plurality of the fifth values, and the sixth value is found by subtracting the maximum fourth value from the minimum fifth value.

4. The method for selecting an electrolytic solution for an electric double layer capacitor, according to claim 1, wherein the first value, the second value, and the third value are calculated by molecular orbital computations.

* * * * *